United States Patent [19]
Erban

[11] 3,822,610
[45] July 9, 1974

[54] TRACTION ROLLER TRANSMISSION WITH TORQUE LOADING MEANS

[76] Inventor: Richard T. Erban, 145-38 Bayside Ave., Flushing, N.Y. 11354

[22] Filed: Aug. 31, 1972

[21] Appl. No.: 285,517

[52] U.S. Cl. .................................. 74/691, 74/796
[51] Int. Cl. ............................................ F16h 37/06
[58] Field of Search .................... 74/690, 691, 796

[56] References Cited
UNITED STATES PATENTS

| | | | |
|---|---|---|---|
| 2,646,696 | 7/1953 | Kepes | 74/691 |
| 3,277,745 | 11/1966 | Harned et al. | 74/691 |
| 3,545,302 | 12/1970 | Schofield | 74/691 |
| 3,713,353 | 1/1973 | Scheiter | 74/691 X |

*Primary Examiner*—Samuel Scott
*Assistant Examiner*—J. Reep

[57] ABSTRACT

This invention relates to traction roller transmissions with infinitely variable driving ratio, which are especially designed for the propulsion of automotive vehicles. In order to compete with presently used drives, an infinitely variable transmission must have a high efficiency of over 95 percent and a long service fatigue life when operating over long time periods at full engine power. Presently known designs can not meet these requirements. The transmission here disclosed is based on a novel concept and design and will deliver full engine power at 97 to 98 percent efficiency over the upper ratio range, including top speed ratio, and has a service fatigue life of over 100,000 vehicular miles. These results are achieved for a toric race and roller drive having a torque loading device for maintaining the required pressure in the tractive roller contacts by the combination with the torque load device of a novel planetary torque-split device, causing a preselected modification of the axial pressure forces and their characteristic over the entire ratio range; reducing the axial pressures produced by the torque load device only for the upper part of the speed ratio range also reduces the losses of power in the tractive rolling contacts, thereby increasing the efficiency and the service fatigue life of the toric rollers and races. FIG. 7 and text give details of this modification of the axial pressure characteristic as against the characteristic obtained by a conventional torque load device.

6 Claims, 7 Drawing Figures

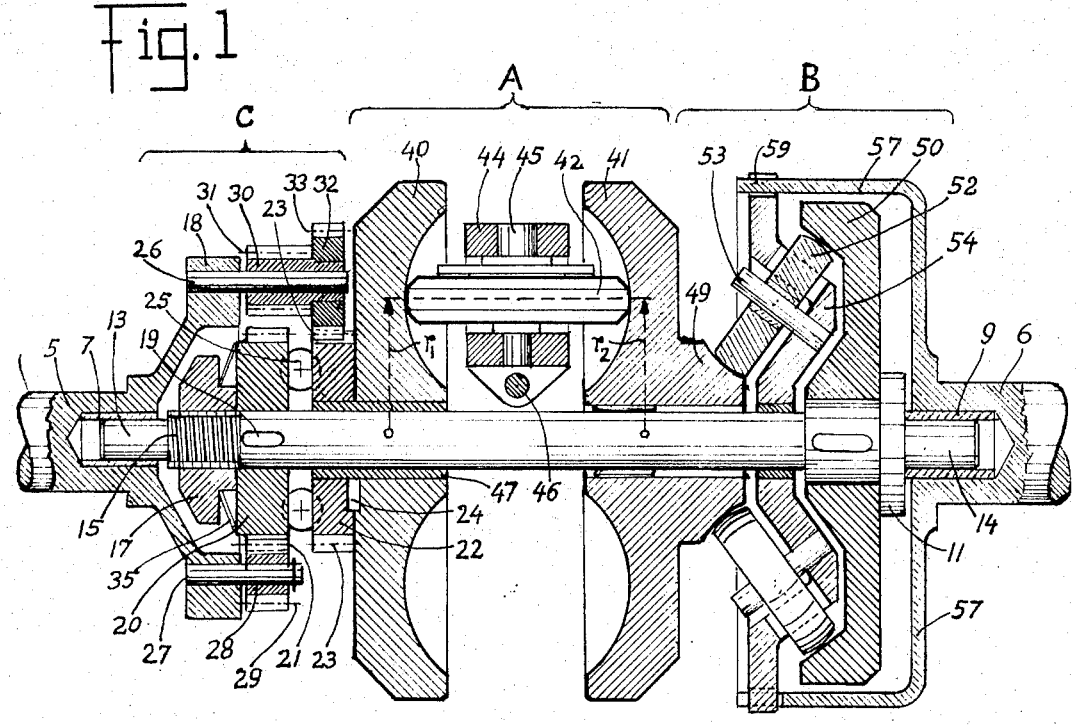
Fig. 1
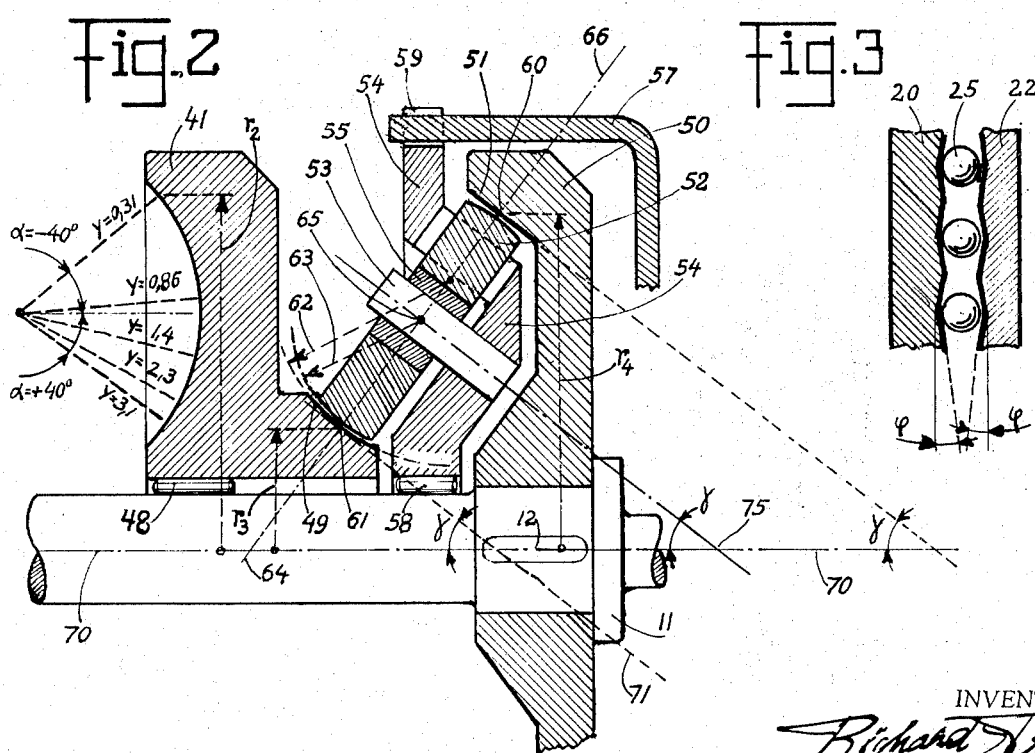
Fig. 2
Fig. 3
INVENTOR.
Richard Urban

INVENTOR.
Richard Urban

TRACTION ROLLER TRANSMISSION WITH TORQUE LOADING MEANS

This invention relates to the toric race and roller type in general, and more particularly, it refers to a transmission which has been especially designed and developed to meet the requirements in the field of automotive propulsion for an infinitely variable control of speed ratio and driving torque under all operating conditions of engine speed and available power. Toric race and roller variable speed transmissions in sizes from ½ to 50 HP and efficiencies between about 85 and 90 percent have been used in industrial applications for many years and the experience of performance by several thousand units has been very satisfactory.

However, in the automotive field, where a stepless control of speed and torque seemed highly desirable, it was found that variable speed transmissions, based essentially on industrial design structures, were unsuitable and during tests failed to meet the operating conditions specific to automotive propulsion useage. The main problems were caused by a lack of high efficiency in that part of the speed ratio range where full engine power is used for extended periods of time, such as long distance cruising and similar conditions where conventional gear shifts use a direct drive shifting. A loss of 10 to 15 percent of propulsion power in this range would reduce the fuel economy, speed performance and acceleration to unacceptably low figures. In order to be competitive, a variable speed toric transmission needs to have its losses reduced to between one-third and one-fourth of the figures obtained by conventional toroidal race and roller systems.

The new transmission here disclosed meets these and several other basic requirements of automotive propulsion systems. Its specific design belongs to the class of socalled differential systems which are a combination of a toroidal race and roller with a planetary system. A considerable variety of such differential systems have been proposed and are known, and some may at first glance seem to be quite similar to the new system here disclosed. Closer examination however reveals that their descriptions of the operation and interaction of forces and torques are either vague or often completely erroneous, so that they can not be used as a basis for computation and design of a new system that must show a stipulated and provable performance. The transmission here disclosed is therefore the result of an independent thorough study and analysis of the dynamics of power transmission in a differential system of variable ratio traction roller type. Verification through extended tests has yielded new physical data of great importance for the designing of roller traction drives with stipulated ultimate performance.

The improved understanding of the correct mechanical relationship between essential elements of a differential system led to the conception of novel structures and their combination with selected parts from known traction roller drives, finally developing into the new transmission system which possesses performance capabilities far superior to those of any previous known toric race and roller system.

The new transmission will deliver full engine power at an efficiency between 98 and 97 percent at any speed ratio near the top speed position of the control. In addition, it will provide a fast, stepless acceleration from zero (standstill) to top speed by delivering an uninterrupted flow of full engine power to the driving wheels, without requiring additional power control means such as clutches, brakes or torque converters. For slow speed maneuvering on a steep slope, between forward and reverse, a drive torque up to ten times engine torque can be controlled even at zero speed for holding the car stationary without using a brake.

These and other advantages of the invention and the new structural means employed in carrying it out are the object of the following description and accompanying drawings wherein:

FIG. 1 is a sectional view of the complete transmission

FIG. 2 shows on an enlarged scale the right end portion of the transmission of FIG. 1, in order to clearly point out certain critical specific relations between several component parts.

FIG. 3 is a partial sectional view of the torque loading device shown at the left end of FIG. 1

Figure 4:
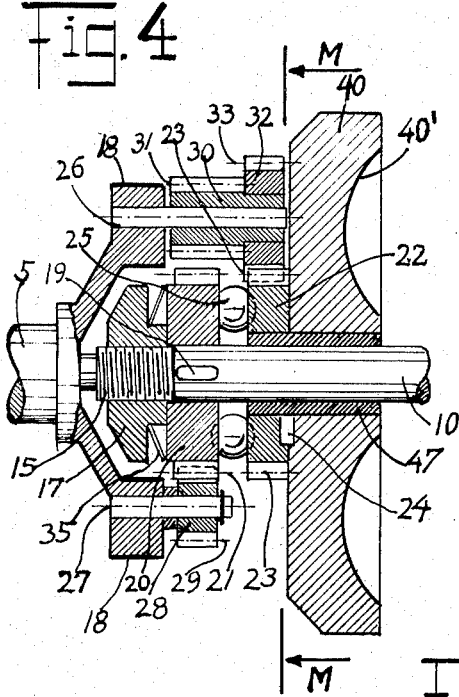

FIG. 4 is a longitudinal section of the means employed to split the input torque into two components of predetermined size and shows how each of these components is applied to a separate member of the torque load system in order to obtain the torque load characteristic required for high efficiency of power transmission in the upper portion of the speed ratio range. This part of the ratio range corresponds to the positions of the toroidal rollers between the positions marked $Y = 0.31$ and $Y = 1.4$ in FIG. 2

Figure 5:
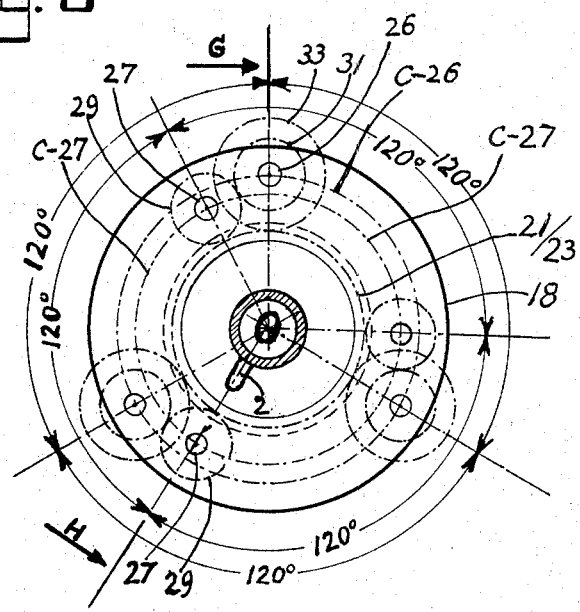

FIG. 5 is a cross sectional view of some parts of FIG. 4

Figure 6:
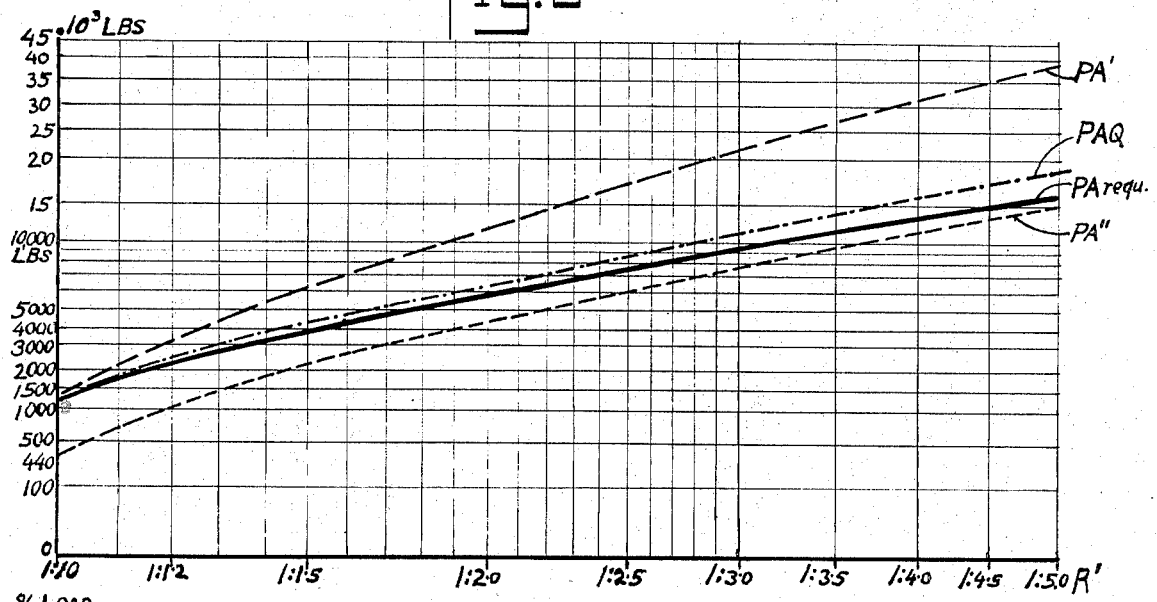

FIG. 6 is a graph showing the axial pressure forces that must be applied to the race and roller toric system in order to achieve tractive transmission in the rolling contacts free of any slipping and at optimum efficiency. These axial required forces are shown for various positions of the rollers of the variable ratio toric system; the corresponding output speed ratios are marked 1:1 for top speed down to 1:5 at the left end of the graph.

Figure 7:
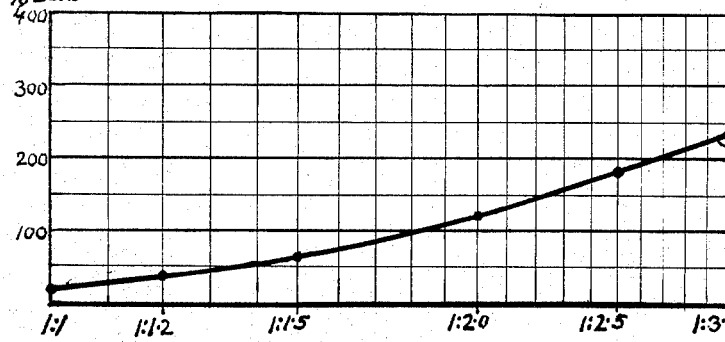

FIG. 7 is a graph showing the magnitude of the power load carried by the toric system in percent of the total power transmitted by the complete transmission to the output shaft, in relation to the speed ratio at which the output shaft is driven. It is seen that for ratios between top speed and a 1:1.5 down, the load upon the toric system is less than 100 percent, and that for top speed (1:1) it is less than 25 percent. These very low load figures explain the high efficiency and the long service fatigue life of this transmission system.

Returning again to the description of the drawings, FIG. 1 shows a sectional view of the complete transmission system, being a composite of three main sections, or groups, denoted (A), (B) and (C).

The section (A) per se shows the basic design of the known toroidal race and roller system for obtaining a variable ratio between the two toric races by changing the inclination of the rollers, of which only one is shown in its position of 1:1 ratio between the two races. The structure of the roller support means and the mechanism for changing their inclination are not an object of this present invention, but since precise synchronisation of the individual roller speeds is beneficial to a high efficiency, I recommend to use the design shown in my U.S. Pat. No. 2,910,878.

Section (B) comprises the new structure for a high efficiency traction roller planetary system with a fixed ratio. FIG. 2 shows it at an enlarged scale together with all of the important geometric parameters required for high efficiency operation as fully explained in the related text.

Section (C) is the novel structure for operating the torque-loading device in a special manner whereby the axial pressure applied to the traction roller systems is generated by the integral effect of several selected modified torques, as will be fully explained below. For a differential system as here considered, the structure (C) is vitally important to achieve a high efficiency in the high speed positions, because in a differential system the axial pressure required may vary up to 30:1 (depending on speed and torque ratio) whereas in a conventional toric race and roller system, it will vary usually not more than 9:1. Full details of section (C) will be given in connection with FIGS. 4 and 5.

FIG. 3 is a partial sectional view of the torque loading device 20-25-22 as shown in FIG. 1 (C). It is a flattened-out cylindrical section through the centers of the balls 25, co-axial with the axis of shaft 10, and shows the true angle of the cam surfaces, $\phi$( PHI ) = 7°50'.

FIGS. 4 and 5 show all necessary details of the novel structure section (C), using the same identification numbers for like parts as in FIG. 1. FIG. 4 is again a longitudinal sectional view similar to the same view at the left end of FIG. 1. FIG. 5 is a transverse sectional view along the lines M—M in FIG. 4. The structure shown in the upper half of FIG. 4 is a radial sectional view taken along the lines G–O of FIG. 5, while the lower part shown in FIG. 4 is a radial sectional view as indicated by the line H–O of FIG. 5.

FIG. 6 is a diagram showing the axial forces, or pressures, required to be applied upon the race and roller systems in order to achieve maximum efficiency; these pressures must vary in accordance with the ratio to which the speed control has been set, and also with the engine torque as input to the transmission. The diagram is for full engine torque input.

FIG. 7 is a diagram showing by the curve L-1 the percentage of full engine power which is carried by the toroidal roller system at various speed ratios. It is seen that at top speed (which is marked 1:1), the power transmitted by the toric roller system is only 13.3 percent of the full engine power which is transmitted between input shaft 5 and output shaft 6; It is also seen that for all speed settings between top speed (1:1) and a lower speed of about 63 percent thereof (ratio 1:1.6) the load upon the toroidal system (A) is substantially less than 100 percent of full engine power. The only tractive contacts which transmit full engine power are between the outer race 51 and the rollers 52 of the planetary system (B), FIGS. 1 and 2.

It has been pointed out that the tractive contact pressure must vary not only with the torque but also with the ratio and this should be automatically to avoid complexity in operation. Several designs have been proposed to solve this by providing more than one torque loading device and transmit the sum of individual pressures to the toric roller system. Among these is my U.S. Pat. No. 2,127,588 which teaches the use of two independent torque loaders arranged to apply to the rolling contacts the sum of the generated individual pressures. While this device works satisfactorily under conditions of relatively slow changes of driving force and speed ratio, difficulties through unavoidable backlash between several torque loaders arise in transmissions that are subject to rapid changes of ratio or driving power which happen in automotive propulsion. My later patents, Nos. 2,148,857 and 2,152,796 describe other designs for solving the same difficulty by using only a single torque loading device (i.e. one set of balls and cams) to produce the required contact pressure by feeding it the resultant of several component torques using a system of floating levers. While these structures give results that are physically correct, their practical use is restricted by limitations inherent in such leverage systems (flexibility, inertia, backlash) and the relatively high cost of manufacture.

It is therefore the object of the present invention to create a structure made of simple design, low inertia rigid components for feeding a modified, composite torque to a single torque loading device for generating the stipulated diagram of contact pressure. Fully explained here below with FIGS. 4 and 5. Referring again to FIG. 1, the shaft 10 carries co-axially aligned thereon the toroidal system 40-41 between the planetary differential 49-50-52 at the right end and the torque loading device 20-25-22 at the left end. Shaft 10 has a flange 11 at the right end and a threaded part 15 with nut 17 at the left end serving as abutments for the axial pressure generated by the torque loading device 20-25-22. The torque-cam disc 20 is locked for torque to the shaft 10 by the key 19, which can also be a splined connection, and is slideable axially for adjustement through the screw 15-17. A spring 35 provides a minimum axial pressure in series with the torque-cam generated pressure. The torque-cam disc 22 is mounted coaxially with race 40 upon the sleeve 47, which is freely rotatable and axially slidable upon the shaft 10. The key 24 locks the torque-cam disc 22 to the race 40 for torque transmitting. The race 41 with toroidal surface 41' is freely rotatable upon shaft 10 through bearing 48 and has an extension 49 that carries a track for the planetary roller 52. (see FIG. 2) The orbit track of the planetary is formed by the surface 51 of the race 50, which is keyed to the shaft 10 and supported axially by the shoulder 11. The shaft 10 is coaxially supported by the extensions 13 (left end) and 14 (right end), both of which are journalled in bearing sleeves, 7 and 9 respectively; The left extension 13 is supported by the input shaft 5, free to rotate and move axially relative to it. The extension 14 is similarly supported by the output shaft 6, which has a bell-shaped extension 57 for engaging the radial arms 59 of the planet roller carrier 54, thus transmitting the torque from the planet roller carrier to the output shaft. The roller carrier 54 is free to rotate upon the shaft 10 by the bearing 58 (FIG. 2); it also has a limited amount of freedom for the axial adjustment required to have the geometric axis of the pin 53 pass through the geometric center 65 of the roller 52. The roller 52 is journalled upon the pin 53 by the needle-bearing 55 which holds the plane of rotation of the roller at right angles to the geometric axis of the pin 53. The roller-diameter between the contact with the inner race 49, at 61, and the contact with the outer race 51, at 60, lies then upon the line 64–66. In order to obtain a stable equilibrium between the surface pressures in the points 60, 61, also the tractive forces in these points, peripheral force between the roller 52 and its pin 53, it is necessary that the following conditions are precisely maintained: (1) the angle of inclination of the geometric axis, gamma ($\gamma$) must be the same for each of the four rollers 52 and their pins 53, and the geometric axis of each pin 53 must intersect the rotational axis 70—70 of the shaft 10 at one point 75 which is the same for all of the pins 53. (2) the angle of inclination of the taper surface 51 of the race 50 must be the same as the angle gamma of the geometric axis of the pins 53. (3) the center of the radial profile of the track of race 49, (profile radius 62), must be so positioned that a tangent parallel to the geometric axis of the pin 53, and positioned in a radial plane with said pin axis, will have its point of contact with said profile near the middle of the width of the track. Under these specified conditions, the roller carrier 54 will adjust its axial position automatically so that for each roller the geometric axis of the pin 53 will pass through the geometric center 65 of the roller. Free axial adjustability must also be provided between the carrier 54 and the bell-shaped part 57 of the output shaft to prevent any interference by extraneous forces with the correct position of the carrier 54, since this would put lateral forces upon the tractive contacts 60 and 61, disrupting the equilibrium between the contact forces, which may reduce traction. This must be avoided because contact 60 carries full engine power at all times and ratios.

In order to describe the operation of the torque-loader section (C), it is necessary to establish the required axial pressure upon the roller systems and its variations depending on the actual speed ratio. To give a fast and clear understanding, a specific example of a transmission will be considered first to outline the operating conditions for the new structures and stipulate their basic characteristics. The accompanying drawings are a miniaturisation of a transmission built for an input power of 29 FtLbs at 5500 rpm and an output torque of 45 FtLbs at 3500 rpm top-speed. To give a reference for actual dimensions, the toroidal rollers 42 have a diameter of 2.625 inches, their centers are 1.65 inches from the geometric axis of the transmission and their planes of rotation can be tilted from an angle of plus 40° to minus 40° to the transmission axis; for a given angle of tilt, the rolling contacts describe circular tracks on the races 40 and 41, respectively, the track radii being $r_1$ and $r_2$ respectively. FIG. 1 shows the roller 42 at a tilt angle of zero, where $r_1 = r_2$, and the parameter $y$ denoting the toric ratio is $y = r_1/r_2 = 1$; for full tilt, the radii $r_1$ and $r_2$ respectively can vary between 0.784 inch and 2.48 inches, corresponding to a variation of the toric ratio between 0.315 and 3.15 respectively. The rollers 52 of the planetary system have a spheroidal outer surface and a diameter of 1.7693 inches, making rolling contact with the outer race on a track with radius $r_4 = 2.245$ inches (point 60), and on the inner race on a track with radius $r_3 = 0.83$ inch (point 61); this defines the ratio of the planetary system as $U = r_4/r_5 = 2.7$.

To permit computation for each tractive rolling contact of the required axial pressure — PA — at a given speed ratio, the following parameters must be known:

a. the amount of torque to be transmitted
b. the track radius of the rolling contact
c. the coefficient of traction applicable
d. the cosine of the tilt angle of the roller If the figures for "PA" so obtained are entered in a coordinate system as FIG. 6, the conecting lines will form a diagram, or torque load characteristic, which must be closely matched by curve obtained through the operation of the torque load device connected to the tractive roller system. (section C in FIG. 1) Referring to FIG. 6, please note that the horizontal scale for the ratio R' ($R' = R \cdot l/1.55$) is linear, while the vertical scale for the axial pressure PA in Lbs is a cubic scale.

The speed ratio scale R' is obtained from the transmission ratio R by setting the top speed ratio as 1 and marking all other steps in relation thereto. The top-output speed is $l/1.55$ of the input speed, for the setting of the toric rollers 42 as tilt angle minus 40'. FIG. 6 shows 4 curves, denoted PA requ., for the axial pressure required; the curve marked PA' shows the pressure generated if the full torque of Race 40 is used with the cam angle so adjusted that the pressure at ratio 1 is just the required figure. It is seen that at ratio 5.0, the pressure is 38,000 lbs against 15,700 lbs required, indicating an overload of 2.4 times.

Using the same torque of race 40, but with cam angles to give close to 15,700 lbs at ratio 5.0 generates only about 440 lbs at top speed ratio 1, where 1170 lbs are required and failure through slippage would result. Curve denoted PAQ, which follows the required curve very close in the upper speed range from 1 to 3 ratio, is obtained by feeding the torque-loading device a modified torque of the value $T_1 + k \cdot T_o = TQ$ where $k$ may be between about 7 and 15 percent of U; U = ratio of the planetary system, as set forth above in the present case with U = 2.7, we find K between 0.19 and 0.40; the lower figure gives closer conformity at the high speed ratios (1, 1.2, 1.4, 2.0), the other near the low speed ratios, and both still depending somewhat on the choice of tilt angles for the rollers 42. In the present case it was found that 8 percent of U, that is $k = 0.21$ gives very satisfactory results as the curve marked PAQ indicates.

FIGS. 4 and 5 illustrate how the torque split and recombination of component torques to operate the torque loading device is obtained. The following torques appear in the transmission:

Input shaft, engine torque, $T_0$; Output shaft torque $T_6$

Toric system, Race 40, Torque $T_1$, Race 41, Torque $T_2$

Planet system, Inner Race 49, Torque $T_3$
Planet system, Outer Race 50, Torque $T_4$ The following relations apply between the the torques and the parameters $y$ and $U$ of the transmission ($y$ is the ratio of the toric system, $y = r_1/r_2$; U is the planetary ratio $r_4/r_3$)

Input torque: $T_o$ (known engine torque)
Output torque: $T_6$ (planet carrier torque) $T_6 = U - 1/U - y \, T_o$
Toric race 40: $T_1 = T_6 \, U/U - y$
Toric race 41: $T_2 = {}_{T1} \, 1/y$
Planet race 49: $T_3 = T_2 = T_6/U - 1$
Planet race 50: $T_4 = T_6 \, U/U - 1$ The tabel below gives for 9 specific ratios the values of several torques and the required axial pressure (PA):

| y | 0,315 | 0,55 | 0,72 | 1,0 | 1,5 | 1,9 | 2,1 | 2,2 | 2,5 |
|---|---|---|---|---|---|---|---|---|---|
| R | 1,55 | 1,7 | 1,86 | 2,18 | 3,1 | 4,65 | 6,2 | 7,75 | 18,5 |
| R' | 1,0 | 1,1 | 1,2 | 1,4 | 2,0 | 3,0 | 4,0 | 5,0 | 12,0 |
| PA | 1170 | 1760 | 2370 | 3260 | 5580 | 9600 | 13200 | 15700 | 40800 LBS |
| $T_1$ | 3,86 | 6,9 | 10,5 | 17,1 | 36,3 | 69,0 | 104,0 | 127 | 362 FtLBS |
| $T_4$ | 32,6 | 35,0 | 39,4 | 46,2 | 65,2 | 98,0 | 113,5 | 163 | 392 FtLBS |
| $T_6$ | 45,0 | 49,4 | 54,0 | 63,3 | 89,5 | 134,0 | 180,0 | 225 | 536 FtLBS |

It is seen that over the speed range from $R' = 1$ to $R' = 12$ the variation of $T_4$ and $T_6$ are also about 1:12, while the variation of the required axial pressure is close to 1:35. Since a torque loading device produces axial pressure in a straight proportion to the torque transmitted, it is clear that all of the available torques per se are unsuitable to generate the required figures of axial pressure, or would cause overloads up to 300 percent. I found that a practical torque load characteristic can be generated by splitting one of the torques into components of selected size, recombining one of them with one of the other torques and feeding this composite to the torque cams. The novel structure which accomplishes this is a a planetary drive having pairs of planetary pinion gears meshing with each other and with orbit gears carried at the periphery of the torque-cam discs of the torque load device. The input torque $T_o$ is directly transmitted from the input shaft 5 to the planet carrier ring 18. two sets of 3 pins each (26,26,26 and 27,27,27) are rigidly supported by the ring 18. The pins 26 are on a center circle C26, the pins 27 are on a center circle C27. Three sets of intermeshing planetary spur gears (28 and 30) are freely rotatable upon the pins 26 and 27 respectively. Planetary gear 28 has pitch circle 29 and idler 30 has pitch circle 31. Planetary gear 30 has rigidly connected to it a spur gear 32, pitch circle 33, which meshes with the pitch circle of spur gear 23 on the outside diameter of torque-cam disc 22, transmitting to it a split torque of torque component $T_o$. The planetary gear 28, pitch circle 29 meshes with the pitch circle of the spur gear 21 on the outside diameter of the torque cam-disc 20, transmitting to it the other part of the split torque of $T_o$.

FIG. 5 shows 3 sets of twin idler gears positioned 120° apart from each other, but it is understood that any symetric arrangement, with 2, 3 or more sets could be useful. It is seen that the split portion $k \cdot T_o$ of $T_o$ transmits to the torque cam-disc 22 an addition to the torque $T_1$ from race 40 and that the combined torques of a size $T_q = T_1 + kT_o$ will activate the torque loader 22-25-20 (For all speeds between zero and top speed forward, the torque $T_1$ goes from the race 40 to the shaft 10, passing the torque loader in the direction 22-25-20) In the drawing FIGS. 4 & 5, the spur gears of the torque cams 20 and 22 are shown of the same pitch circle diameter 21 & 23. This is done for convenience of manufacture, but they could be of different size and fullfil the same function. The proportion of the split torque components is not dependent upon any single circle diameter, but is determined by the effective total gear ratio between input shaft 5, cam 20 and 22 respectively. Inspection of FIG. 5 will show that since the gears of the torque cams have the same size pitch diameters (21 and 23 respectively), the modification of the split torque is the inverse of the ratio of the pitch diameters of the planetary pinion gears meshing with 21 and 23, that is 29 and 33. This ratio is near 1.65, so that the split portion of torque delivered to gear 23 of the cam 22 is 0.50 : 1.65, or close to 0.30 of torque $T_o$. The torque load characteristic generated by this structure will then correspond to the modified torque $T_q = T_1 + 0.30 T_o$. A similar modification of the split torque could be obtained by having planetary pinion gears of identical size and reducing the pitch diameter 23 of the orbit gear of cam 22.

It will be understood that the disclosures herein of the various aspects of my invention are by way of illustration only and that the principles involved may be reduced to practice in other specific embodiments within the spirit and scope of the invention and that it is not intended to limit the invention in any other way than as defined in the appended claims.

What I claim as new and desire to secure by letters Patent is:

1. A traction transmission comprising a variable ratio toric race and roller system and a fixed ratio planetary system having a plurality of planetary rollers between several races coaxially aligned with said toric races system, a driving, a driven and an intermediate shaft, a carrier for said planetary rollers connected to said driven shaft, both races of said toric system free to rotate relatively to each other upon said intermediate shaft, one of said toric races connected to one of said planetary races, the other planetary race connected to said intermediate shaft, a torque loading device coaxial upon said shaft, comprising two discs rotatable relative to each other, each disc having a plurality of torque cams arranged facing the torque cams of the other disc, a plurality of balls between opposing cams, one of said torque cam-discs connected to the other of said toric races for rotation therewith, the other torque cam-disc connected to said intermediate shaft, and each of said cam-discs provided on its periphery with a spur gear, a plurality of planetary pinion gears arranged in pairs surrounding said spur gears, a ring shaped extension of said driving shaft having pins for rotatably supporting said pinion gears so that in each pair the pinion gears mesh with each other and each pinion gear will independently mesh with one of the spur gears of the torque cam-discs, causing the torque from the driving shaft to be split ineo two components of preselected size, one of which is delivered to the torque cam-disc connected to the toric race, and the other delivered to the torque cam-disc connected to the intermediate shaft, whereby the characteristic of the axial pressure generated by this differential torque loading device is made to follow closely the optimum curve over a selected part of the speed ratio range.

2. In a traction roller transmission, having a driving, a driven and an intermediate shaft, and comprising a fixed ratio planetary race and roller system having two concentric races coaxial with a variable ratio toric race and roller system having first and second races and including a torque load device having two disc with multiple torque cams, one of said torque cam-discs connected to the first of said toric races and the other connected through the intermediate shaft to one of said planetary races, the other planetary race connected to the second of said toric races for free rotation therewith about said intermediate shaft the combination of the torque load device with a planetary differential torque split device comprising two orbit gears and planetary pinion gears rotatably carried by a flange of said driving shaft and meshing with both of said orbit gears, one of which is connected to said first toric race and the other to said intermediate shaft, whereby the torque of the driving shaft is delivered in two independent components of predetermined size to both of said cam-discs of the torque loading device, to effect a predetermined modulation of the characteristic of the axial pressure generated by the torque load device.

3. In a traction roller transmission comprising a variable ratio toric race and roller system and a fixed ratio planetary system coaxially aligned upon a common shaft intermediate the driving shaft and the driven shaft of the transmission, said fixed ratio planetary system having two races and planetary rollers in tractive contact therewith, a carrier for said rollers connected to said driven shaft, one of said planetary races connected to one of said toric races for free rotation upon said intermediate shaft and the other of said toric races connected to said shaft through a torque load device having two relatively rotatable discs with multiple torque cams each, one of said torque cam-discs connected to the last said toric race, and the other cam-disc connected to said intermediate shaft, the other planetary race being connected for torque and axial pressure to said intermediate shaft, and a planetary differential torque split device adapted to deliver the torque of the driving shaft in two predetermined components independent of each other to both of said cam-discs of the torque load device, said planetary differential device comprising two orbit gears, one of each connected to one of said cam-discs and a plurality of planet pinion gears meshing with both orbit gears and being rotatably carried by a flange extension of said driving shaft, whereby the driving torque is delivered in two components of predetermined size to both cam-discs of the torque loqd device to effect a modulation of the axial pressure characteristic over a selected portion of the speed ratio range between driving and driven shaft.

4. In a variable ratio transmission having a driving and a driven shaft in axial alignment, a fixed ratio planetary system having a sun gear member, a coaxial orbit gear member and a plurality of planetary pinion members rotatably carried by an extension of said driven shaft, a traction race and roller system comprising two toric races and a torque load device having two discs capable of limited rotation between each other and each disc provided with a plurality of torque cams axially facing the torque cams of the other disc, one of said torque cam discs connected to one of said toric races, the other connected to the above said orbit gear member, the combination with said torque load device of a differential planetary drive having two orbit spur gears meshing with a plurality of planetary pinion gears rotatably mounted on an extension of said driving shaft, each of said orbit spur gears connected to one of said torque cam discs, whereby the torque of the driving shaft is split into two torque components of preselected size and each of them transmitted separately to either of the two torque cam discs, so that the torque device is activated only by one of said compomemts of the input torque of the input shaft in addition to the torque transmitted between said toric race and the said planetary orbit gear member.

5. In a variable ratio traction transmission having a driving and a driven shaft, comprising a fixed ratio planetary system and a toric race and roller system including a torque load device having two torque cam discs rotatable relatively to each other for generating axial pressure in response to such relative rotation caused by torques applied to them for maintaining the tractive contact between rollers and races, the combination with a planetary differential torque split system having two orbit gears and a plurality of planetary pinion gears rotatably supported by said driving shaft and meshing with said orbit gears, each of said orbit gears connected to one of said torque cam discs of the torque load device, whereby the torque of the driving shaft is split into two components that are transmitted separately to the torque cam discs to achieve a modification of the axial pressure generated by other torques transmitted through the torque load device.

6. In a traction roller transmission, a variable ratio race and roller system and a fixed ratio planetary system having spheroidal rollers in tractive contact with a sun race having a concave race profile, and with an orbit race having a straight line race profile, the inclination of the straight line profile with respect to the geometric axis of both races being exactly the same as the inclination angle of the geometric tangent to the concave profile of the sun race in its point of contact with the spheroidal roller, so that the profile tangents in both contact points of the spheroidal roller are exactly parallel to each other, whereby any lateral displacement of the roller due to unsymmetrical distribution of pressure in the tractive contact is prevented.

* * * * *